J. L. LA COUR.
MEANS FOR REGULATING POLYPHASE COMMUTATOR MACHINES.
APPLICATION FILED NOV. 11, 1908.
1,047,955. Patented Dec. 24, 1912.
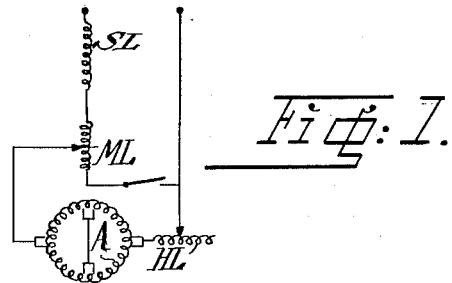
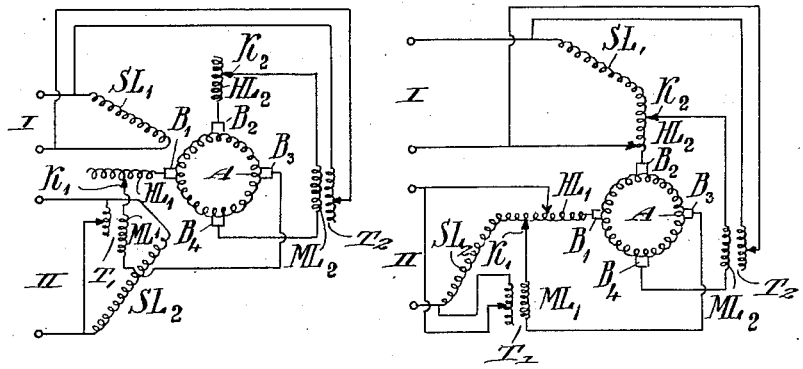
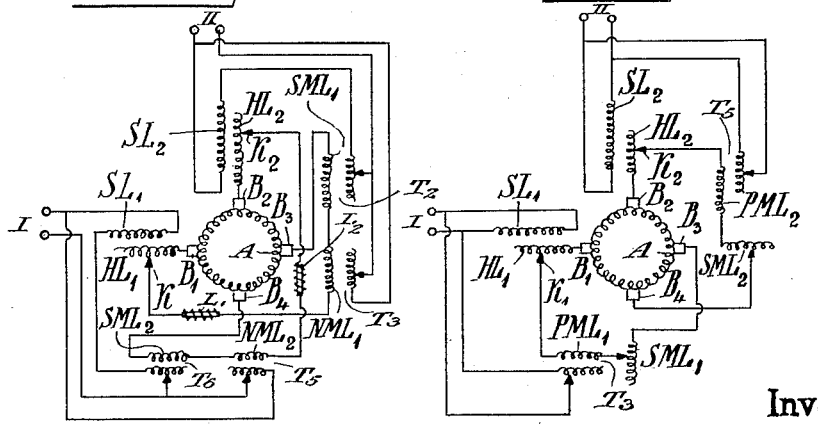
Witnesses.
Jesse K. Sutton.
B. Sommers
Inventor.
Jens Lassen la Cour
by Henry Orth Jr.
Atty.

JENS LASSEN LA COUR, OF VESTERÅS, SWEDEN.

MEANS FOR REGULATING POLYPHASE COMMUTATOR-MACHINES.

1,047,955.     Specification of Letters Patent.     Patented Dec. 24, 1912.

Application filed November 11, 1908. Serial No. 462,159.

*To all whom it may concern:*

Be it known that I, JENS LASSEN LA COUR, of Vesterås, Sweden, electrical engineer, having invented a certain new and useful Improvement in Means for Regulating Polyphase Commutator-Machines, do hereby declare that the following is a full, clear, and exact description of the same.

This invention relates to improved means for regulating polyphase commutator machines.

Referring to the drawings in which like parts are similarly designated:—Figure 1 is a diagram illustrating the regulation of a single phase compensated motor. Fig. 2 is a diagram of a two-phase electric motor illustrating my improved means of regulation. Fig. 3 is a modification showing the auxiliary windings in series with the main winding. Fig. 4 is a further modification in which compound windings are used for supplying magnetizing currents to the motor. Fig. 5 is a diagram illustrating means for adjusting the phase and intensity of the magnetizing currents supplied to the motor.

It is well known that the speed of a compensated single phase commutator motor can be regulated by connecting the armature winding in series with an auxiliary winding which lies in the axis of the armature winding. Such an arrangement is shown in Fig. 1 of the drawings. The said two windings A and HL are in shunt motors short circuited by a small winding ML in which a current serving to excite the machine is induced by any well known means, for instance by the stator main winding SL or by the primary winding of a transformer connected to the circuit. It is a well known fact that the rotor in such a commutator machine always tends to assume such a speed that the total reactance of the armature circuit becomes a minimum. By varying the number of turns of the winding HL the reactance of the armature circuit will be changed, but on account of the tendency to reducing the reactance, the armature changes its speed until the reactance again becomes a minimum. Said device may, as will be hereinafter more particularly set forth, be applied to polyphase machines.

In Figs. 2–5 of the accompanying drawings wherein some forms of such connections for two phase motors are shown, I have shown only two phase arrangements in order to obtain clear or plain figures, but it will be understood that the invention may also be applied to arrangements having a greater number of phases.

Referring now to Fig. 2 of the drawings, A is the armature winding and $SL_1$ and $SL_2$ the main windings. The windings $SL_1$ and $SL_2$ are in the usual manner mounted on the stator. $HL_1$ and $HL_2$ are adjustable auxiliary windings which correspond to the main windings $SL_1$ and $SL_2$ respectively, and are also disposed on the stator core. The armature winding A is connected in series by means of brushes $B_1$ and $B_3$ to the adjustable auxiliary winding $HL_1$ while the corresponding main winding $SL_1$ is directly connected to one of the base conductors I of the electric circuit. In analogous manner the armature winding A is in a direction at right angles to the brushes $B_1$ $B_3$ connected in series by brushes $B_2$ $B_4$ to the adjustable auxiliary winding $HL_2$ while the corresponding main winding $SL_2$ is directly connected to the second phase II of the electric circuit. The armature windings together with the auxiliary windings form the secondary member of the machine and have no direct connection with the main circuit. In the said armature circuits are further connected the secondary windings $ML_1$ and $ML_2$ respectively of small transformers $T_1$ and $T_2$ the primaries of which are adjustable and connected to the phases II and I respectively of the electric circuit. By means of the winding $ML_1$ a magnetizing current the phase of which agrees with that of phase II of the circuit, may be introduced in the armature winding in the direction $B_1$—$B_3$, and in analogous manner a magnetizing current, the phase of which agrees with that of phase I of the circuit, may be introduced in the armature winding by means of the winding $ML_2$ for the armature core in the direction $B_2$—$B_4$.

The operation of the motor described is as follows: When running, the main windings $SL_1$ and $SL_2$ of the stator are supplied with two phase currents from the circuits I and II respectively, the rotor tending to assume a speed at which the reactance of the armature circuits is a minimum. By displacing the contacts $K_1$ and $K_2$ of the auxiliary windings $HL_1$ and $HL_2$ respectively, the speed of the motor may be varied. If the auxiliary windings magnetize in the same direction as the corresponding phase of the armature winding, the motor runs with supersynchronous speed, while subsynchronous speeds are obtained when the auxiliary windings counteract the corresponding phases of the armature winding. The deviation from synchronism will be proportional to the ratio between the turns of the auxiliary winding and armature winding, owing to the fact, before mentioned, that the motor tends to assume a speed corresponding to the minimum of reactance for the armature circuit, just as in all induction machines. The currents introduced into the armature circuits by means of the transformers $T_1$ and $T_2$ cause the power factor ($\cos. \varphi$) of the motor to be so high that the motor takes up only small wattless currents from the line, and this effect may be gained at different speeds by varying the ampere turns of the primaries of the said transformers, thereby controlling the intensity of the magnetizing currents impressed upon the armature circuits.

In Fig. 3 the same two-phase arrangement is illustrated as in Fig. 2, with this difference that the auxiliary windings $HL_2$ and $HL_1$ are connected in series to the main windings $SL_1$ and $SL_2$ respectively. A part of the auxiliary windings $HL_1$ and $HL_2$ is here traversed by the main currents. If required the main currents may flow through the whole auxiliary winding.

Fig. 4, shows a modification of the invention in which the windings supplying magnetizing currents to the armature circuits are arranged as compound windings, the said windings of the first phase $B_1$—$B_3$ of the armature consist of the secondary winding $NML_1$ of a small adjustable shunt transformer $T_3$ and the secondary winding $SML_1$ of a small adjustable series transformer $T_4$. The primaries of said transformers are connected to the second phase II of the line. The windings supplying magnetizing current to the second phase $B_2$—$B_4$ of the armature consist in analogous manner of the secondary winding $NML_2$ of an adjustable shunt transformer $T_5$ and the secondary winding $SML_2$ of an adjustable series transformer $T_6$, the primaries of said transformers being connected to the first phase I of the line. By varying the number of turns in the primaries of the said transformers $T_3$—$T_6$ the intensity of the magnetizing currents may be controlled for obtaining the most favorable power factor when running at different speeds.

In Fig. 5, which shows a modification of the invention in which the intensity as well as the phase of the magnetizing currents may be adjusted, the magnetizing current that is supplied to the armature in the direction $B_1$—$B_3$ is induced by means of the windings $S_0ML_1$ and $PML_1$. The winding $S_0ML_1$ being mounted on the stator core is induced directly by the stator winding $SL_2$. The number of turns of said winding $S_0ML_1$ is adjustable for the purpose of controlling the intensity of the magnetizing current. The winding $PML_1$ forms the secondary winding of a shunt transformer $T_3$ the primary of which is adjustable and connected to the phase I of the line. The E. M. F. of the current induced in the magnetizing circuit $B_1$—$B_3$ by means of the said transformer differs therefore about 90° in phase from that induced in the winding $S_0ML_1$ and by adjusting the number of turns in the primary winding of the said transformer $T_3$, the phase of the current flowing in the circuit $B_1$—$PML_1$—$SML_1$—$B_3$ may accordingly be controlled. In analogous manner the armature is supplied with a magnetizing current in the direction $B_2$—$B_4$ by means of an adjustable stator winding $S_0ML_2$ induced by the main winding $SL_1$ and the secondary winding $PML_2$ of a shunt transformer $T_5$ the adjustable primary of which is connected to the phase II of the line.

As will be seen from the drawings, the shunt-transformer feeding the brushes $B_1$—$B_3$ is according to the construction shown in Fig. 4, connected to the phase II of the line while the corresponding transformer in Fig. 5 for the purpose of controlling the phase of the magnetizing current is connected to the phase I of the line.

As shown in the drawings the auxiliary windings $HL_1$ and $HL_2$ should always be arranged on the same or substantially the same axis as the brushes of the corresponding phase.

In all the forms described above impedance coils may be connected up in the magnetizing circuits if desired. For the sake of simplicity I have shown such coils $L_1$ and $L_2$ in Fig. 4 only.

It is further obvious that the present machines may also be used as dynamo machines for generating alternating currents of a frequency that deviates from the frequency corresponding to the number of revolutions. In this case the machine may be constructed as self-feeding, or be arranged with separate excitation.

I claim—

1. A polyphase commutator machine, comprising a stator having polyphase primary windings and adjustable polyphase auxiliary windings, a rotor having a winding of the direct current type connected by means of a commutator and brushes to the said auxiliary windings and forming together with the latter, polyphase secondary circuits of the machine, and means for supplying magnetizing currents to said secondary circuits, substantially as and for the purpose set forth.

2. A polyphase commutator machine, comprising a stator having polyphase primary windings and adjustable polyphase auxiliary windings, a rotor having a winding of the direct current type connected by means of a commutator and brushes to said auxiliary windings and forming together with the latter secondary circuits of the machine, means for supplying magnetizing currents to said secondary circuits and impedance coils connected in series to said secondary circuits, substantially as and for the purpose set forth.

3. A polyphase commutator machine, comprising a stator having polyphase primary windings and adjustable polyphase auxiliary windings, a rotor having a winding of the direct current type connected by means of a commutator and brushes to said auxiliary windings and forming together with the latter secondary circuits of the machine, and adjustable transformers for supplying magnetizing currents to said secondary circuits, substantially as and for the purpose set forth.

4. A polyphase commutator machine, comprising a stator having polyphase primary windings and adjustable polyphase auxiliary windings, a rotor having a winding of the direct current type connected by means of a commutator and brushes to said auxiliary windings and forming together with the latter secondary circuits of the machine, and adjustable series and shunt transformers, the primaries of which are connected to the main circuit and the secondaries of which are connected in series to the secondary circuits of the machine for supplying magnetizing currents to the latter, substantially as and for the purpose set forth.

5. A polyphase commutator machine, comprising a stator having polyphase primary windings and adjustable polyphase auxiliary windings, a rotor having a winding of the direct current type connected by means of a commutator and brushes to said auxiliary windings and forming together with the latter secondary circuits of the machine, impedance coils connected in series to said secondary circuits, and adjustable transformers for supplying magnetizing currents to said secondary circuits, substantially as and for the purpose set forth.

In testimony that I claim the foregoing as my invention, I have signed my name in presence of two subscribing witnesses.

JENS LASSEN LA COUR.

Witnesses:
EVALD DELMAR,
JOHN DELMAR.